UNITED STATES PATENT OFFICE.

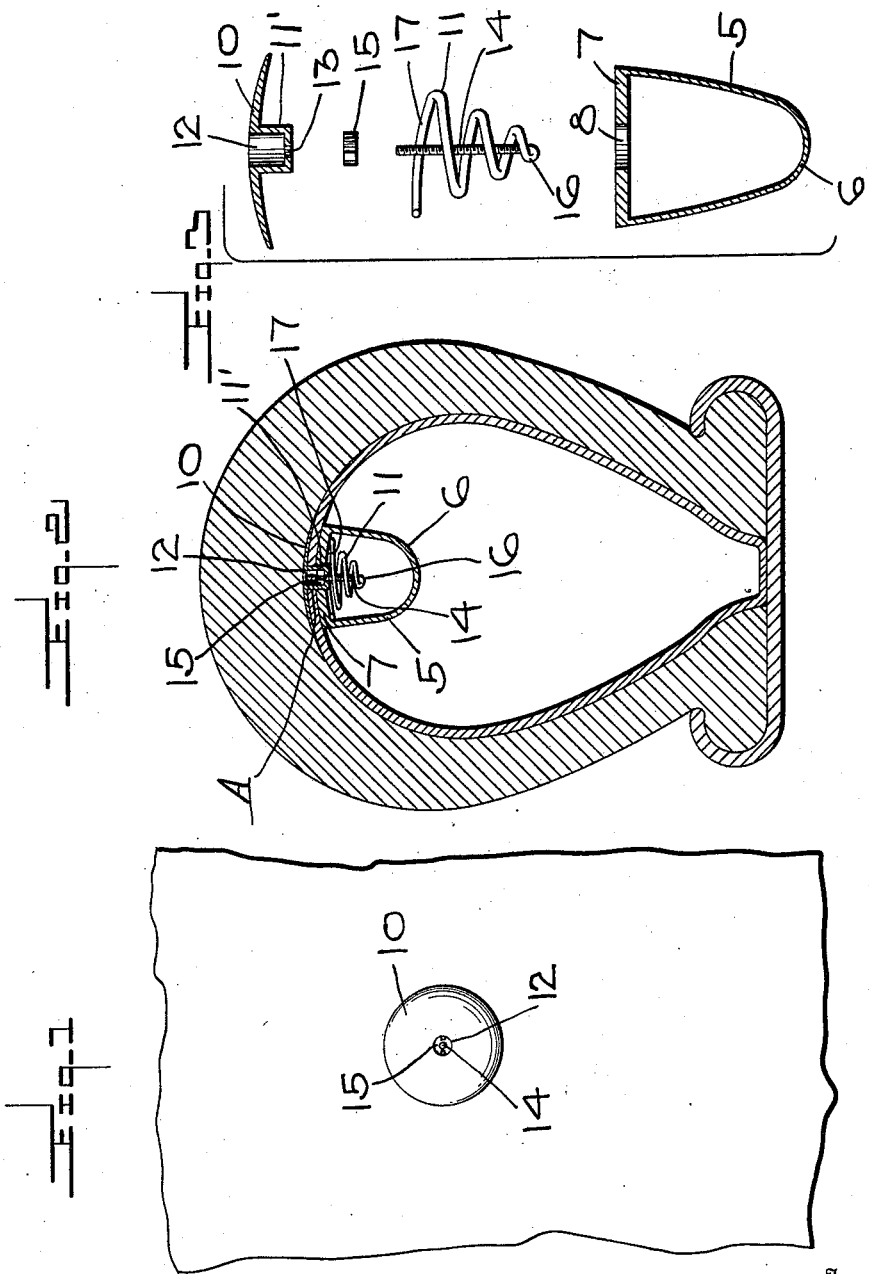

GUSTAV A. E. KAUL, OF HACKENSACK, NEW JERSEY.

TIRE-PLUG.

1,000,524.         Specification of Letters Patent.    Patented Aug. 15, 1911.

Application filed June 8, 1910. Serial No. 565,742.

*To all whom it may concern:*

Be it known that I, GUSTAV A. E. KAUL, a citizen of the United States, residing at Hackensack, in the county of Bergen and State of New Jersey, have invented certain new and useful Improvements in Tire-Plugs, of which the following is a specification.

This invention relates to repair devices and more particularly to devices for repairing pneumatic tires or other air or moisture tight articles, and has for its object to provide a patch which may be easily and quickly applied to an article to be repaired without the use of cement of any character. Its particular object is to produce a patch consisting of a rubber element arranged to be clamped securely between two metal elements, one of the metal elements being constructed and arranged for easy and quick introduction within the article to be repaired, while presenting a proper clamping surface.

Other objects and advantages will be apparent from the following description, and it will be understood that changes in the specific structure shown and described may be made within the scope of the claims without departing from the spirit of the invention.

In the drawings forming a portion of this specification and in which like numerals of reference indicate similar parts of the several views,—Figure 1 is a view of a portion of an automobile tire with the present patch applied thereto. Fig. 2 is a section taken through the patch and tire in place. Fig. 3 is a view of the several parts of the patch detached.

Referring now to the drawings, the present patch includes three elements, a rubber thimble 5 including a closed conical portion of thin rubber 6, having a relatively thick rubber diaphragm 7 at its base, this diaphragm being provided with a central circular opening 8; a metallic washer 10; and a spiral clamping spring 11. The metallic washer 10 is concavo convex, as shown, and has, at its concave side, a central circular boss 11′ which corresponds with a central circular recess 12 in the convex surface of the washer, the boss having a central opening 13 communicating with the recess 12. The spring clamping element 11 consists of a spiral spring, as shown, having its extremity at its minor end turned at right angles to extend longitudinally through the spiral in the form of a threaded pin 14, which is of a size to pass through the opening 13. A nut 15 is provided, and is arranged for threaded engagement upon the pin 14.

As will be seen from the drawings, the point of union of the minor helix of the spring 11 with the attached end of the pin 14, forms a blunt nose 16, which may be engaged through the opening 8, and which thus causes the spring element 11 to move into the member 5 when the spring is rotated.

By reason of the fact that the conical portion 6 of the member 5 is of thin rubber, the blunt nose 16 may be again engaged, with the rubber 6 thereover, through an opening indicated at "A" in a tire, and the spring again rotated to carry both it and the member 5 into the tire, the spring being held by the outer extremity of the pin 14, as will be understood.

In preparing the tire for the introduction of these members, an opening is cut therein around the puncture, of a size to receive the boss 11′, and this boss is of a size to fit in the opening 8 of the diaphragm 7.

After the members 5 and 11 have been engaged within the tire, the washer element 10 is disposed with the outer extremity of the pin 14 through the opening 13, and with the boss 11′ engaged through the openings "A" and 8. The nut 15 is then engaged with the outer extremity of the pin 14, and is screwed home into the recess 12, which draws the minor end of the spring element upwardly and firmly clamps the major helix of this spring element, indicated at 17, against the inner face of the diaphragm 7, thus securely pinching and holding this diaphragm 7 between the helix 17 and the inner concave face of the washer 10, the concavity of this washer causing its edge portion to bite into the outer surface of the tire, and thus aid in effecting an air tight union.

From the foregoing it will be seen that in the present device, there is provided in the element 5, a rubber pocket member having the diaphragm at one end. The provision of the spiral clamping element 11 makes it possible to introduce this element into the tire through a small opening, and thus, as stated in the first portion of this specification, produce a patch in which a rubber element is securely clamped between an inner and an outer metallic clamping element.

What is claimed is:

1. A patch of the class described comprising a spiral spring member having a major and a minor end, a rubber envelop for the spring member, said envelop having a diaphragm at the major end of the spiral spring and extending thereover, a member arranged to extend over the outer face of the diaphragm, and being connected with the minor end of the spring for holding the said spring under increased tension with the said minor end against movement away from the diaphragm, to clamp the diaphragm against the said member.

2. A patch of the class described comprising a conical rubber thimble, a spiral spring engaged within the thimble with its major end toward the major end of the thimble, a diaphragm located at the major end of the thimble, a threaded pin connected with the minor end of the spiral spring and extended outwardly through the diaphragm, a metallic washer having a boss thereon, said diaphragm having an opening of a size to receive the boss, said washer being disposed with its boss engaged upon the threaded pin, said washer having a recess in its face opposite to the boss, and a nut engaged upon the threaded pin and lying in the recess.

3. A patch of the class described comprising a rubber diaphragm having an opening therein, a spiral spring engaged against one side of the diaphragm, a threaded pin connected with the spring and engaged through the opening of the diaphragm, a washer engaged with the pin at the opposite side of the diaphragm from the spring, a nut engaged with the pin at the opposite side of the washer from the diaphragm, and a rubber member surrounding the spring and connected with the diaphragm to prevent the passage of air through the opening of the diaphragm.

In testimony whereof I affix my signature, in the presence of two witnesses.

GUSTAV A. E. KAUL.

Witnesses:
PAUL M. S. PURPS,
RICHARD PYE.

---

Copies of this patent may be obtained for five cents each, by addressing the "Commissioner of Patents, Washington, D. C."